(12) United States Patent
Lin et al.

(10) Patent No.: US 11,877,241 B2
(45) Date of Patent: Jan. 16, 2024

(54) APPARATUSES AND METHODS FOR DISCONTINUOUS RECEPTION (DRX) SUPPORT IN SIDELINK COMMUNICATION

(71) Applicant: MEDIATEK INC., Hsinchu (TW)

(72) Inventors: Guan-Yu Lin, Hsinchu (TW); Ming-Yuan Cheng, Hsinchu (TW); Nathan Edward Tenny, San Jose, CA (US); Xuelong Wang, Beijing (CN)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/772,257

(22) PCT Filed: Dec. 22, 2020

(86) PCT No.: PCT/CN2020/138219
§ 371 (c)(1),
(2) Date: Apr. 27, 2022

(87) PCT Pub. No.: WO2021/139521
PCT Pub. Date: Jul. 15, 2021

(65) Prior Publication Data
US 2022/0353815 A1    Nov. 3, 2022

(30) Foreign Application Priority Data
Jan. 7, 2020 (WO) ............... PCT/CN2020/070580

(51) Int. Cl.
*H04W 52/02* (2009.01)
*H04W 76/28* (2018.01)
*H04W 92/18* (2009.01)

(52) U.S. Cl.
CPC ....... *H04W 52/0232* (2013.01); *H04W 76/28* (2018.02); *H04W 92/18* (2013.01)

(58) Field of Classification Search
CPC .. H04W 52/0232; H04W 76/28; H04W 92/18
(Continued)

(56) References Cited

U.S. PATENT DOCUMENTS 8,743,859 B2 * 6/2014 Lee ............... H04W 76/28
455/425
11,290,863 B2    3/2022 Shrivastava et al.
(Continued)

FOREIGN PATENT DOCUMENTS

CN    109479189 A    3/2019
EP    3 373 663 A1    9/2018
(Continued)

OTHER PUBLICATIONS

International Search Report and Written Opinion dated Mar. 22, 2021, issued in application No. PCT/CN2020/138219.
(Continued)

*Primary Examiner* — Inder P Mehra
(74) *Attorney, Agent, or Firm* — Oblon, McClelland, Maier & Neustadt, L.L.P.

(57) ABSTRACT

A User Equipment (UE) including a wireless transceiver and a controller is provided. The wireless transceiver performs wireless transmission and reception to and from one or more peer UEs. The controller determines a Sidelink (SL) Discontinuous Reception (DRX) configuration set, and applies the SL DRX configuration set to enable a DRX operation for SL communications with the peer UEs via the wireless transceiver; wherein the SL DRX configuration set is determined based on one of the following: one or more types of one or more SL services which the UE is participating with the peer UEs; one or more SL DRX configurations received from the peer UEs; and control information received from a Base Station (BS).

21 Claims, 8 Drawing Sheets

(58) Field of Classification Search
USPC ........................................................ 370/318
See application file for complete search history.

(56) References Cited

U.S. PATENT DOCUMENTS

| | | | |
|---|---|---|---|
| 2016/0073447 A1* | 3/2016 | Rune ................. | H04W 52/0235 370/311 |
| 2018/0227972 A1* | 8/2018 | Tsuboi ................... | H04W 8/00 |
| 2019/0053321 A1* | 2/2019 | Islam .................... | H04L 5/0023 |
| 2019/0174411 A1 | 6/2019 | Xu et al. | |
| 2019/0215890 A1* | 7/2019 | Choi ....................... | H04W 8/24 |
| 2020/0260304 A1* | 8/2020 | Zhou .................... | H04W 72/23 |
| 2021/0329611 A1* | 10/2021 | Karjalainen ......... | H04B 7/0695 |
| 2021/0352758 A1* | 11/2021 | Dutta ................... | H04W 76/14 |
| 2022/0046543 A1* | 2/2022 | Yang ................. | H04W 52/0216 |
| 2022/0150730 A1* | 5/2022 | Freda ................... | H04L 1/188 |
| 2022/0182939 A1* | 6/2022 | Xu .................... | H04W 72/0446 |
| 2022/0264464 A1* | 8/2022 | Seo ....................... | H04W 52/02 |

FOREIGN PATENT DOCUMENTS

| | | |
|---|---|---|
| WO | 2015/115749 A1 | 8/2015 |
| WO | 2018/016882 A1 | 1/2018 |
| WO | 2018/028416 A1 | 2/2018 |

OTHER PUBLICATIONS

LG Electronics Inc.; "Basic Scenarios and Overall Steps for NR Sidelink design;" 3GPP TSG RAN WG2 #103bis R2-1815440; Oct. 2018; pp. 1-7.

Spreadtrum Communications; "Views on Rel-17 Sidelink Enhancements;" 3GPP TSG RAN Meeting #85 RP-191765; Sep. 2019; pp. 1-10.

International Search Report and Written Opinion dated Sep. 27, 2020, issued in application No. PCT/CN2020/070580.

* cited by examiner

APPARATUSES AND METHODS FOR DISCONTINUOUS RECEPTION (DRX) SUPPORT IN SIDELINK COMMUNICATION

CROSS REFERENCE TO RELATED APPLICATIONS

This application claims priority of International Application No. PCT/CN2020/070580, filed on Jan. 7, 2020, the entirety of which is incorporated by reference herein.

FIELD OF THE APPLICATION

The application generally relates to mobile communications and, more particularly, to apparatuses and methods for Discontinuous Reception (DRX) support in Sidelink communication.

BACKGROUND OF THE APPLICATION

Description of the Related Art

In a typical mobile communication environment, User Equipment (UE) (also called Mobile Station (MS)), such as a mobile telephone (also known as a cellular or cell phone), or a tablet Personal Computer (PC) with wireless communications capability, may communicate voice and/or data signals to one or more service networks. The wireless communications between the UE and the service networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc.

These RAT shave been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services. In LTE and 5G NR, device-to-device (D2D) communication is supported to allow two or more UEs to directly communicate with one other. This D2D communication may also be referred to as Sidelink (SL) communication, and it may be applied to vehicular communication services which is also known as Vehicle-to-Everything (V2X) services. V2X collectively refers to communication technology via all interfaces with vehicles, including Vehicle-to-Vehicle (V2V), Vehicle-to-Infrastructure (V2I), Vehicle-to-Person (V2P), and Vehicle-to-Network (V2N).

Particularly, according to release 16 of the 3GPP specifications for NR-based V2X, diverse QoS traffic is supported and a UE is allowed to transmit/receive traffic delivered by uni cast, group cast, and broadcast simultaneously. Although with significant enhancement over the LTE-based V2X, current NR-based V2X design has not yet introduced any power saving related mechanism. Since a UE does not know when other UEs will try to communicate with it, the UE needs to monitor Sidelink Control Information (SCI) continuously over the PC5 interface even though there may not be any peer UE nearby. Disadvantageously, the continuous SCI monitoring over the PC5 interface will result in significant power consumption of the V2X UE.

Moreover, in NR-based V2X, if mode-1 resource scheduling (i.e., SL resource scheduled by network) is applied, the radio resources for new transmission and re-transmission are scheduled by the network. That is to say, in case there may be upcoming SL traffic, the UE needs to keep monitoring on the Uu interface for receiving SL grant scheduling from the network, and disregards the power saving rules currently in use on the Uu interface. Similarly, the continuous monitoring over the Uu interface will degrade the power saving performance on the Uu interface.

Therefore, it is desirable to have a robust and efficient power saving mechanism for NR-based V2X.

BRIEF SUMMARY OF THE APPLICATION

The present application proposes a power saving mechanism for NR-based V2X, in which a Discontinuous Reception (DRX)-like operation is introduced for SL communication.

In a first aspect of the application, a UE comprising a wireless transceiver and a controller is provided. The wireless transceiver is configured to perform wireless transmission and reception to and from one or more peer UEs. The controller is configured to determine an SL DRX configuration set, and apply the SL DRX configuration set to enable a DRX operation for SL communications with the peer UEs via the wireless transceiver; wherein the SL DRX configuration set is determined based on one of the following: one or more types of one or more SL services which the UE is participating with the peer UEs; one or more SL DRX configurations received from the peer UEs; and control information received from a Base Station (BS).

In a second aspect of the application, a method is provided, which comprises the following steps: determining an SL DRX configuration set by a UE; and applying the SL DRX configuration set to enable a DRX operation for SL communications with one or more peer UEs by the UE; wherein the SL DRX configuration set is determined based on one of the following: one or more types of one or more SL services which the UE is participating with the peer UEs; one or more SL DRX configurations received from the peer UEs; and control information received from a B S.

Other aspects and features of the present application will become apparent to those with ordinarily skill in the art upon review of the following descriptions of specific embodiments of the UEs and the methods for DRX support in SL communication.

BRIEF DESCRIPTION OF THE DRAWINGS

The present application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
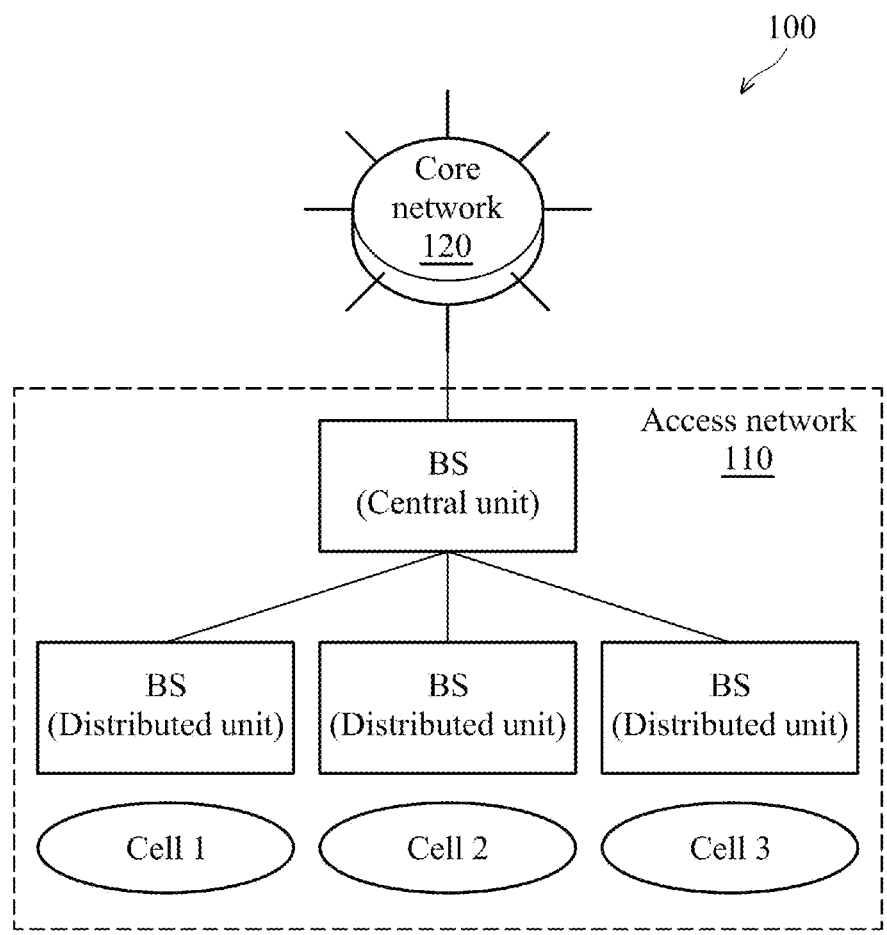
FIG. 1 is a schematic diagram illustrating a cellular communication network according to an embodiment of the application.

FIG. 1 is a schematic diagram illustrating a cellular communication network according to an embodiment of the application.

As shown in FIG. 1, the cellular communication network 100 may include an access network 110 and a core network 120. The access network 110 may be responsible for processing radio signals, terminating radio protocols, and connecting one or more UEs (not shown) with the core network 120. The core network 120 may be responsible for performing mobility management, network-side authentication, and interfaces with public/external networks (e.g., the Internet).

In one embodiment, the cellular communication network 100 may be a 5G NR network, and the access network 110 and the core network 120 may be a Next Generation Radio Access Network (NG-RAN) and a Next Generation Core Network (NG-CN), respectively.

An NG-RAN may include one or more Base Stations (BSs), such as next generation NodeBs (gNBs), which support high frequency bands (e.g., above 24 GHz), and each gNB may further include one or more Transmission Reception Points (TRPs), wherein each gNB or TRP may be referred to as a 5G BS. Some gNB functions may be distributed across different TRPs, while others may be centralized, leaving the flexibility and scope of specific deployments to fulfill the requirements for specific cases. For example, different protocol split options between central unit and distributed unit of gNB nodes may be possible. In one embodiment, the Service Data Adaptation Protocol (SDAP) layer and the Packet Data Convergence Protocol (PDCP) layer may be located in the central unit, while the Radio Link Control (RLC) layer, the Medium Access Control (MAC) layer, and the Physical (PHY) layer may be located in the distributed units.

A 5G BS may form one or more cells with different Component Carriers (CCs) for providing mobile services to UEs. For example, a UE may camp on one or more cells formed by one or more gNBs or TRPs, wherein the cells which the UE is camped on may be referred to as serving cells.

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be understood that the cellular communication network 100 described in the embodiment of FIG. 1 is for illustrative purposes only and is not intended to limit the scope of the application. For example, the RAT utilized by the cellular communication network 100 may be a legacy technology, such as the LTE, LTE-A, or TD-LTE technology, or may be a future enhancement of the 5G NR technology, such as the 6G technology.

Figure 2:
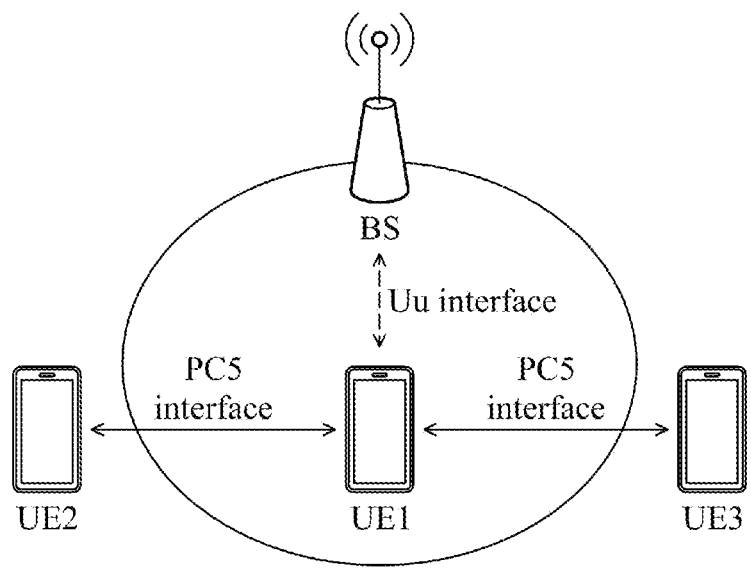
FIG. 2 is a schematic diagram illustrating an SL communication environment according to an embodiment of the application.

FIG. 2 is a schematic diagram illustrating an SL communication environment according to an embodiment of the application.

As shown in FIG. 2, UE1 is located within the radio coverage of the BS and is able to communicative with the BS over the Uu interface, while UE2 and UE3 are out of the radio coverage of the BS. In addition to supporting the Uu interface, UE1 also supports the PC5 interface for SL communication with UE2 and UE3.

Specifically, UE1 may operate as a scheduler UE (or called relay UE) which schedules/allocates the radio resources for UE2 and UE3 (or called scheduled UEs) according to the configuration received from the BS or pre-defined in the 3GPP specifications for NR-based V2X. As a relay, UE1 may forward traffic between UE2 and UE3, and/or forward traffic between UE2/UE3 and the BS. For example, UE1 may be configured as a Layer 2 relay or a Layer 3 relay. Alternatively, UE1 may not operate as a relay, and may initiate direct SL communication with either one or both of UE2 and UE3.

Please note that the 3GPP specifications mentioned herein are used to teach the spirit of the application, and the application should not be limited thereto.

Figure 3:
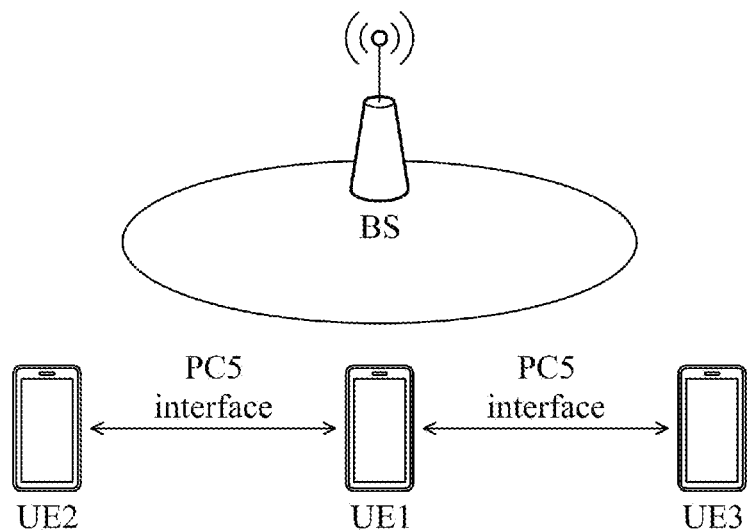
FIG. 3 is a schematic diagram illustrating an SL communication environment according to another embodiment of the application.

FIG. 3 is a schematic diagram illustrating an SL communication environment according to another embodiment of the application.

As shown in FIG. 3, none of UE1~UE3 is located within the radio coverage of the BS, but SL communication between UE1~UE3 is possible over the PC5 interface.

Specifically, UE1 may operate as a scheduler UE (or called relay UE) which schedules/allocates the radio resources for UE2 and UE3 (or called scheduled UEs) according to the configuration pre-defined in the 3GPP specifications for NR-based V2X or the configuration previously received from the BS when UE1 was camped on the BS. As a relay, UE1 may forward traffic between UE2 and UE3. For example, UE1 may be configured as a Layer 2 relay or a Layer 3 relay. Alternatively, UE1 may not operate as a relay, and may initiate direct SL communication with either one or both of UE2 and UE3.

Figure 4:
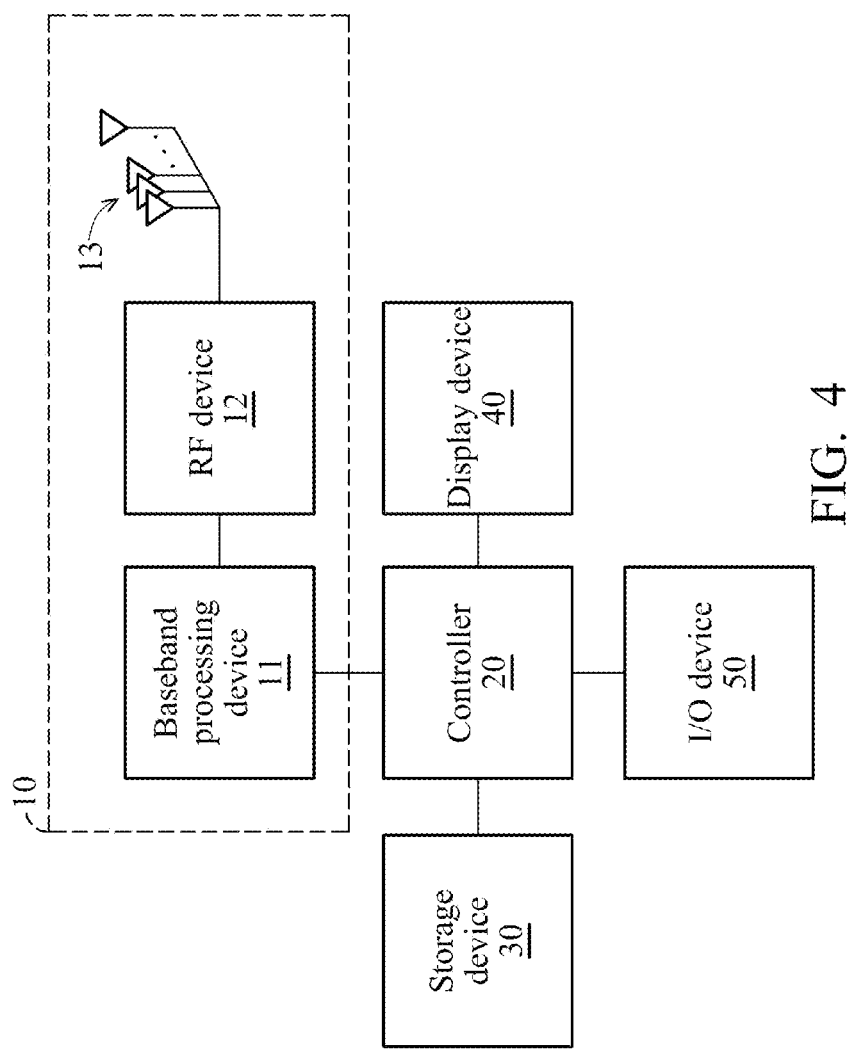
FIG. 4 is a block diagram illustrating a UE according to an embodiment of the application.

FIG. 4 is a block diagram illustrating a UE according to an embodiment of the application.

As shown in FIG. 4, a UE (e.g., a scheduler UE or scheduled UE) may include a wireless transceiver 10, a controller 20, a storage device 30, a display device 40, and an Input/Output (I/O) device 50.

The wireless transceiver 10 is configured to perform wireless transmission and reception to and from other UEs and/or the BS(s) of the access network 110.

Specifically, the wireless transceiver 10 may include a baseband processing device 11, a Radio Frequency (RF) device 12, and antenna 13, wherein the antenna 13 may include an antenna array for beam forming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz~300 GHz for mmWave) utilized in the 5G NR technology, or may be 900 MHz, 2100 MHz, or 2.6 GHz utilized in LTE/LTE-A/TD-LTE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the service network 120, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for UE-coordination based resource allocation for Sidelink communication.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method for UE-coordination based resource allocation for Sidelink communication.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or there under for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 4 are for illustrative purposes only and are not intended to limit the scope of the application.

For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 40 and/or the I/O device 50.

Legacy DRX Operation for the Uu Interface

In Release 15 of the 3GPP specifications for NR, the DRX configuration for the Uu interface includes several timers and counters to define when the UE should turn on its wireless transceiver to monitor the Physical Downlink Control Channel (PDCCH) for possible scheduling, and the period of time in which the wireless transceiver remains turned on is referred to as the DRX active time. For those times not belonging to the DRX active time, the UE does not need to monitor the PDCCH and may turn off the wireless transceiver for power saving. As the DRX configuration is provided by the network, the network and the UE would have aligned understanding on the DRX active time, and the network will initiate communication with the UE only when the UE is in the DRX active time.

Specifically, in NR Release-15, three parameters, including the DRX offset, the DRX cycle, and the DRX-ON duration, are used to define the basic on-off pattern of the DRX operation. The DRX cycle refers to the periodicity of each on-off pattern. For example, if the DRX cycle is 10 milliseconds (ms), it means that the on-off pattern repeats every 10 ms. The starting time of each DRX cycle is determined by the DRX offset (more specifically, start offset and slot offset). In the start of each DRX cycle, a UE should turn on its wireless transceiver to monitor the PDCCH for a period of time which is referred to as the DRX-ON duration (defined by the DRX-ON duration timer). If no PDCCH data is received in the DRX-ON duration, the UE turns off its wireless transceiver to save power until the end of the DRX cycle and resumes PDCCH monitor in the start of the next DRX cycle.

In addition, if there is traffic activity when DRX is configured, the UE may still keep awake for more time (e.g. the DRX active time may be extended) to perform possible data transmission and reception. For example, if the UE receives PDCCH data indicating that a new transmission (e.g., an uplink/downlink (UL/DL) transmission) is scheduled, the UE may start the DRX inactivity timer. When the DRX inactivity timer is running, the UE should keep monitoring the PDCCH. The idea is that since there is a new transmission ongoing, there may be further traffic following the new transmission.

Moreover, the DRX operation may also need to take the Hybrid Automatic Repeat reQuest (HARQ) transmission/retransmission into account. Specifically, when the UE sends an UL packet, the network may need some time (i.e., the UL HARQ RTT time) to prepare scheduling for an HARQ retransmission, which means that the network will not schedule any UL retransmission for the same HARQ process. In response, the UE may sleep during the UL HARQ RTT time. When the UL HARQ RTT time elapses, the UE may wake up to monitor the PDCCH for possible HARQ retransmission for a period of time controlled by the HARQ retransmission timer. If no HARQ retransmission is received when the HARQ retransmission timer is running, the UE may assume that the network does not intend to send an UL grant for HARQ retransmission for this HARQ process, and thus, the UE may go to sleep again. For the DL direction, the DL HARQ RTT timer and DL HARQ transmission/retransmission may apply similar designs of the UL HARQ RTT timer and UL HARQ transmission/retransmission.

SL DRX Operation for the PC5 Interface

In order to introduce a DRX-like mechanism for SL communication, a V2X UE needs to know when to communicate with the peer UE, i.e., whether the peer UE is in the SL DRX active time. Without this information, the UE may initiate SL communication with the peer UE when the peer UE is sleeping (i.e., the peer UE turns off its wireless transceiver for power saving), and the UE may further perform unnecessary HARQ retransmission due to no response being received from the peer UE. Therefore, some coordination is required for the UEs to have an aligned understanding on the SL DRX configuration of one another.

In the present application, the DRX operation for SL communication with all peer UEs may apply the same SL DRX configuration, or the DRX operation for SL communication with each peer UE may apply a respective SL DRX configuration. An SL DRX configuration may include the information of an SL DRX offset, an SL DRX cycle, and an SL DRX-ON duration to specify the DRX on-off pattern for SL channels monitoring. In addition, the SL DRX configuration may include the information of an SL DRX inactivity timer which is used to extend the SL DRX active time, and a DRX retransmission timer for SL Rx, a DRX retransmission timer for SL Tx, an HARQ RTT timer for SL Rx, and an HARQ RTT timer for SL Tx which are used to further manage the SL DRX active time during the HARQ procedure.

In one novel aspect of the application, the SL DRX inactivity timer may be started/restarted in response to one of more of the following conditions. For example, the SL DRX inactivity timer may be started/restarted when the UE receives SL-related Radio Network Temporary Identifier (RNTI) (e.g., SL-RNTI, SL Configured Scheduling (SLCS)-RNTI, and SL Semi-Persistent Scheduling V-RNTI) from a BS for configuring SL resources for new transmission, for re-transmission, or for SL configured grant activation/deactivation. For example, the SL DRX inactivity timer may be started/restarted when the UE receives Sidelink Control Information (SCI) associated with one of the SL services which the UE is participating with the peer UEs (e.g., the received SCI includes one of the destination ID of this UE for new transmission only or for both new transmission and re-transmission, or the received SCI includes a destination ID which associated with the UE's interested V2X service for new transmission or retransmission). In this example, the SL DRX inactivity timer can be started or restarted upon receiving the first stage or second stage SCI of the concerned SCI. For another example, the SL DRX inactivity timer may be started/restarted when SL mode-2 resource scheduling (i.e., SL resource selected by UE) is configured for the UE and the UE performs resource selection or reselection for a new transmission only or for either a new transmission or a re-transmission.

The DRX retransmission timer for SL Rx associated with a receiving HARQ process be started when the HARQ RTT timer for SL Rx associated with the same receiving HARQ process expires. Alternatively, this timer may be started when an SCI is received for Physical Sidelink Shared Channel (PSSCH) reception on the same receiving HARQ process, and stopped when an SL MAC Protocol Data Unit (PDU) corresponding to the same receiving HARQ process is received.

The DRX retransmission timer for SL Tx associated with a transmitting HARQ process may be started when the HARQ RTT timer for SL Tx associated with the same transmitting HARQ process expires. Alternatively, this timer may be started when the UE receives a PDCCH data indicating an SL resource for transmission (i.e., SL mode-1 resource scheduling) from the BS for this transmitting HARQ process, or when the UE selects a resource for SL transmission (i.e. SL mode-2 resource scheduling) for this transmitting HARQ process.

The HARQ RTT timer for SL Rx associated with a receiving HARQ process may be started when an SCI is received for PSSCH reception on this receiving HARQ process. Alternatively, this timer may be started when an SL MAC PDU is received in a dynamic SL grant and/or in a configured SL grant for this receiving HARQ process. Alternatively, the UE may start the HARQ RTT timer for a receiving Sidelink HARQ process when the UE sends out the HARQ feedback to the transmitter UE for the previous received SL MAC PDU (PSSCH) on this receiving HARQ process.

The HARQ RTT timer for SL Tx associated with a transmitting HARQ process may be started when the UE receives a PDCCH data indicating a resource for SL transmission (i.e., SL mode-1 resource scheduling for new transmission and/or for retransmission), or when the UE selects a resource for SL transmission (i.e. SL mode-2 resource scheduling). Alternatively, this timer may be started when a SL MAC PDU is transmitted in a configured SL grant and/or a dynamic SL grant on this transmitting HARQ process. Alternatively, the timer may be started when the UE transmits the SCI for the transmission or retransmission of a SL MAC PDU. Alternatively, for mode-1 scheduling, the HARQ RTT timer for a transmitting SidelinkHARQ process may be restarted when the UE sends PUCCH as SL HARQ feedback for this transmitting SidelinkHARQ process to the gNB, aiming to request SL grants for retransmission or new transmission for this transmitting SidelinkHARQ process. Alternatively, the HARQ RTT timer for a transmitting SidelinkHARQ process is restarted after the scheduled/configured time for the receiving UE to send HARQ feedback (e.g. PSFCH).

The SL DRX active time may be in the unit of absolute time (e.g. subframe, millisecond, or slot), or could be in the unit of slots available for PSSCH monitoring. For example, the SL DRX active time is in the unit of PSCCH occasion. For example, the SL DRX on duration timer is counted down only during the monitored reception resource pool (rather than the selected transmission resource pool). Similarly, the SL DRX inactivity timer may also be in the unit of absolute time or be in a unit available for receiving PSSCH. The HARQ RTT timer for transmission and for reception may be in the unit of absolute time because the HARQ RTT timer reflects the time for a UE to respond. The retransmission timer for a receiving HARQ process may be in the unit of absolute time, or in a unit of time for receiving PSCCH/PSSCH (e.g. only counted down during a reception resource pool). In contrast, the retransmission timer for a transmitting HARQ process may be in the unit of absolute time, or in a unit of time for transmitting PSCCH/PSSCH (e.g. only counted down in a transmitting resource pool).

SL DRX Active Time

Based on the SL DRX parameters and timers described above, the SL DRX active time (i.e., the time the UE should stay awake (e.g., turn on it wireless transceiver) during the SL DRX operation to at least monitor PSSCH) may be determined based on the set of the SL DRX configurations of different peer UEs. In one embodiment, a UE may be in the SL DRX active time when the SL DRX-ON duration timer is running, or when the SL DRX inactivity timer is running, or when the SL DRX retransmission timer of any transmitting or receiving HARQ process is running. Besides, a UE may stay in the SL DRX active time if the UE has pending data or pending CSI report to transmit to its peer UE. For unicast or groupcast communication, a UE may stay in the SL DRX active time if the UE has pending data or pending CSI report to transmit to its peer UE and its peer UE is also available to receive traffic (e.g. in the SL DRX active time as well). Besides, the SL DRX active time may include the timer for a UE to sense the channel, i.e., a UE is in the SL DRX active time if the UE is monitoring the PSSCH, e.g., to collect sensing result for transmission resource selection.

Since a UE may apply the same or different SL DRX configurations to communicate with multiple peer UEs simultaneously, the UE may determine its SL DRX active time based on the traffic activity with the peer UEs. Specifically, the UE may determine whether each peer UE is in its SL DRX active time or not according to the SL communication with this peer UE.

In one embodiment, UE maintain SL DRX active time per UE, while maintain SL DRX timers per link. As long as any of SL on duration timer, SL DRX inactivity timer, and SL DRX retransmission timer for transmitting or receiving HARQ process is running, UE stays in SL active time.

In one embodiment, a UE may maintain a respective SL DRX active time for each SL link to a peer UE (i.e. Sidelink active time per link). That is, each SL link to a peer UE has its own SL DRX active time, SL DRX-ON duration timer, SL DRX inactivity timer, HARQ RTT timers for SLTx and Rx, and DRX HARQ retransmission timers for SL Tx and Rx. The UE should stay in the SL DRX active time, as long as any one of the SL DRX-ON duration timers, the SL DRX inactivity timers, and the DRX HARQ retransmission timers for SL Tx/Rx of all SL links to the peer UEs is running. That is, the SL DRX active time of the UE (i.e., Sidelink active time per UE) may be determined to be the joint set of the SL DRX active times of all SL links to the peer UEs.

In another embodiment, a UE may maintain only one SL DRX inactivity timer, and the single SL DRX inactivity timer is shared by all SL links to the peer UEs. This means that no matter a new transmission/reception happens on which link or to which peer UE, the SL DRX inactivity timer should always be started/restarted. In this embodiment, separate links to different peer UEs may share the same or separate SL DRX-ON duration timers. The UE should stay in the SL DRX active time, as long as the UE-specific SL DRX inactivity timer, or any one of the SL DRX-ON duration timer(s) and the DRX HARQ retransmission timers for SL Tx/Rx is running.

In one embodiment, for a unicast link, the SL DRX timer could be configured per peer UE, per unicast link, or per PC5 RRC connection. For example, the SL DRX configuration may be identified by the source ID and the destination ID of an SL link. For example, the SL DRX configuration may be configured for each combination of source ID, destination ID, and cast type. It means that even for the same pair of source ID and destination ID, different cast types may apply different SL DRX configurations.

In one embodiment, for either one of unicast/groupcast/broadcast, the SL DRX configuration could be associated with the destination ID. For example, for groupcast and broadcast, each UE can identify the V2X service based on the groupcast/broadcast destination ID and thus can knows the SL DRX configuration associated with the V2X service. For example, a UE can know the transmission pattern of a V2X service based on the SL DRX configuration associated with the used groupcast/broadcast, and thus monitor the timing of transmission pattern to receive the interested groupcast/broadcast service.

A UE may simultaneously have several SL DRX configurations to apply, e.g., different peer UEs apply different SL DRX configurations, and different broadcast/groupcast service apply different SL DRX configurations as well. In this case, the UE should monitor the joint set or superposition of all SL DRX active time requested by the peer UEs and the interested groupcast/broadcast services indicated in their SL DRX configurations. For example, a UE may receive an SL DRX configuration indicating when its peer UEs or when its interested groupcast/broadcast services may perform SL transmission. This UE then needs to keep awake during the transmission pattern indicated by any of its peer UEs and any of its interested groupcast/broadcast services. For another example, a UE may receive an SL DRX configuration indicating when its peer UEs would be awake for data reception. The UE then needs to keep awake during the SL DRX-ONduration of a peer UE if this UE wants to communicate with the peer UE.

To further clarify, the SL DRX active time may have some sort of impact on the Uu DRX active time (i.e., the DRX active time for the Uu interface). For example, for a mode-1 UE in the RRC_CONNECTED state, the Uu interface of the UE should be kept in the DRX active time (i.e., the Uu DRX active time may be extended even if it has elapsed) to receive SL grants from the network when the PC5 interface of the UE is still in the SL DRX active time (i.e., the SL DRX active time has not elapsed). Alternatively, if the Uu interface is not in the DRX active time (e.g., the Uu DRX active time has elapsed), the PC5 interface should be configured to enter the DRX non-active time (i.e., the SL DRX active time should be stopped). That is, the UE's power saving behavior associated with the Uu interface will be interrupted by the SL communication over the PC5 interface. In other words, the SL transmission over the PC5 interface may degrade the UE's power saving performance over the Uu interface.

In one example, if the Uu interface is in the DRX off time, only high-priority SL traffic may trigger SL Buffer Status Report (BSR)/Scheduling Request (SR)/Random Access Channel (RACH) to interrupt the Uu interface from sleeping, and low-priority SL traffic may be delayed or transmitted via mode-2 resource scheduling (i.e., no need to wake up the Uu interface).

In one example, if the Uu interface is in the DRX off time and the UE is configured with mode-1 resource scheduling, the low-priority SL traffic may be kept in the transmission buffer and the UE should wait for the next SL DRX-ON duration to start transmission.

In one example, if the Uu interface is in the DRX off time, a mode-1 UE may perform autonomous fallback to mode-2 resource scheduling to transmit SL data upon satisfying the requirement to operate in mode-2 resource scheduling (e.g., sensing result for resource selection is available).

In one example, if the Uu interface is in the DRX off time and the UE is configured with mixed-mode resource scheduling (i.e., both mode-1 and mode-2 are allowed), the low-priority SL traffic may be transmitted via mode-2 resource scheduling to reduce traffic latency.

The network may configure either mode-1 or mode-2 resource scheduling for a UE based on the UE's SL traffic priority. For example, if the SL traffic has a high priority, the network may configure the UE with mode-1 resource scheduling. If all SL traffic available for transmission has a lower priority, the network may configure the UE with mode-2 resource scheduling, in which there is no need to strictly align the Uu DRX active time and the SL DRX active time since the UE can select resource by itself to transmit the low-priority SL traffic.

A mode-1 UE has SL configured grant in type-1 (RRC configured) or type-2 (DCI activated/deactivated). When a mode-1 UE enables the SL DRX operation, an issue arises regarding whether the UE is allowed to send SL traffic in the configured grant not within the SL DRX active time.

In one embodiment, if the configured grant is not in the SL DRX active time, the UE is not allowed to use the configured grant for a new transmission, but is allowed to use the configured grant for a retransmission. This is because whenever an SL transmission/retransmission is performed, the HARQ RTT timer for SLTx will be started/restarted, and after the HARQ RTT timer for SLTx expires, the HARQ retransmission timer for SLTx will be started for the UE to enter the SL DRX active time to perform the retransmission.

In one embodiment, if the configured grant in not in the SL DRX active time, the UE is allowed to use the configured grant for a new transmission, so that delay-sensitive SL traffic (e.g., some URLLC type of SL traffic) may be transmitted as soon as possible.

In one embodiment, whether a UE is allowed to use the configured grant not in the SL DRX active time depends on the priority or type (e.g. eMBB or URLLC) of the SL traffic. If there is SL traffic above a priority threshold (e.g. based on the comparison of logical channel priority), the UE may use the configured grant to transmit the high-priority SL traffic. Note that once the UE performs SL transmission for new data, the SL DRX inactivity timer is restarted and the UE enters the SL DRX active time. If all SL data available for transmission is below the priority threshold, the UE is not allowed to use the configured grant to transmit the low-priority SL traffic. This feature can be implemented by introducing enhancement for SL Logical Channel Prioritization (LCP) procedure. For example, each SL configured grant may be associated with a priority threshold for a UE to check when this UE is in non-active time. When in non-active time, the UE may use a configured grant for data transmission only if the UE has data with a priority higher than the priority threshold of this configured grant, and the high-priority data may pass the SL LCP check to be included into this configured grant for transmission. Alternatively, each SL configured grant may be associated with a type (e.g. eMBB or URLLC) of SL traffic, and the UE may be allowed to use a configured grant only when the type of the SL traffic available for transmission is the type associated with this configured grant.

SL DRX Configuration Determination

Each SL DRX configuration may be determined based on the type of the SL service which the UE is participating with the associated peer UE, or based on the SL DRX configuration received from the associated peer UE, or based on the control information received from a BS.

In one embodiment, a UE may apply the same SL DRX configuration for communicating with all peer UEs. For example, to simplify the calculation of the SL DRX active time, a UE may inform all peer UEs of the same SL DRX configuration.

Figure 5:
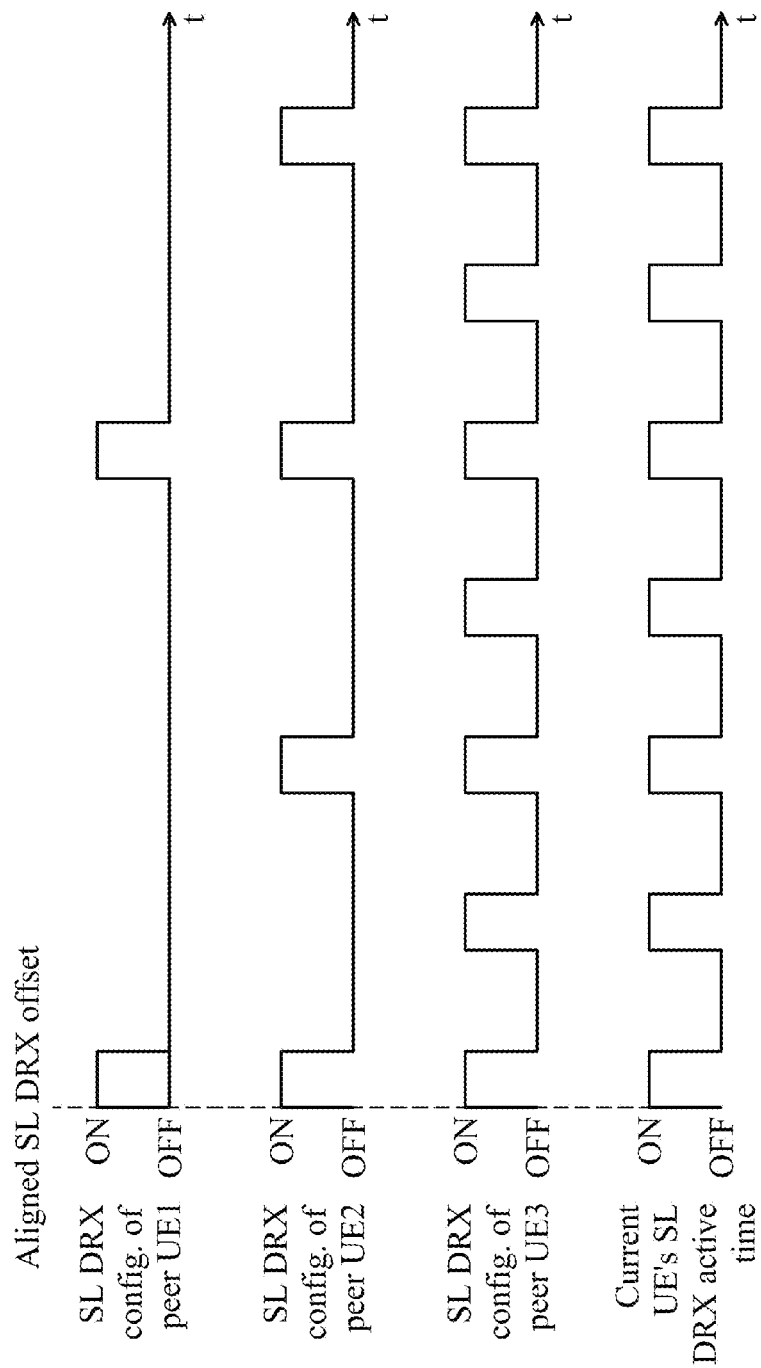
FIG. 5 is a schematic diagram illustrating the determination of an SL DRX configuration for a UE with aligned SL DRX offsets of peer UEs according to an embodiment of the application.

In another embodiment, a UE can apply different SL DRX configurations for communicating with different peer UEs. Specifically, each SL DRX configuration may be determined based on the type of the ongoing service (e.g., V2X application). For example, if the type of ongoing service with a peer UE is very delay-tolerant, a longer SL DRX cycle may be applied. Furthermore, the SL DRX offsets of different SL DRX configurations may be set with the same value (i.e., the SL DRX offsets are aligned) to reduce the union of the SL DRX active times of the peer UEs, as shown in FIG. 5. The SL DRX configuration associated with the V2X application/ V2X service may come from a higher layer, such as the NAS (non-access stratum) layer, the V2X layer, or the V2X application layer, etc.

To further clarify, for a mode-1 (i.e., mode-1 resource scheduling) or mode-2 (i.e., mode-2 resource scheduling) UE in the RRC_CONNECTED state, the SL DRX configuration applied for a peer UE (per PC5 link) or all peer UEs may be controlled by the network (e.g., the cellular communication network 100) or by the UE itself. For a mode-2 UE out of the network coverage or in the RRC_INACTIVE/ RRC_IDLE state, the SL DRX configuration may be controlled by the network (e.g. via system information or per-configuration) or may be selected by the UE itself.

In one example, a mode-1 or mode-2 UE in the RRC_CONNECTED state may configure its SL DRX configuration based on dedicated signaling received from the network.

In one example, a mode-2 UE in the RRC_CONNECTED state may configure its SL DRX configuration by itself, e.g., based on the ongoing SL traffic pattern/application.

In one example, a UE in the RRC_IDLE/RRC_INACTIVE state may configure its SL DRX configuration based on the system information for SL DRX configuration, which is broadcasted by the network. The system information including the SL DRX configuration may be configured per cell or per area (e.g., all serving cells in the same area apply the same SL DRX configuration) by the network.

In one example, a UE in the RRC_IDLE/RRC_INACTIVE state may configure its SL DRX configuration by itself, e.g. based on ongoing SL traffic pattern.

In one example, an out-of-coverage UE may configure its SL DRX configuration based on pre-configuration for Sidelink.

In one example, an out-of-coverage UE may configure its SL DRX configuration by itself, e.g. based on ongoing SL traffic pattern.

In one example, for a mode-1 and/or mode-2 UE in the RRC_CONNECTED state, its SL DRX configuration may be configured by the network, in which a BS may configure the SL DRX configuration to be aligned with the UE's Uu DRX configuration (e.g., set the same DRX offset, the same DRX ON duration, or the same DRX inactivity timer value in both the Uu DRX configuration and the SL DRX configuration. In this way, the probability that Uu sleep time is interrupted by SL traffic activity may be reduced.

In one example, for a mode-1 and/or mode-2 UE, the SL DRX configuration may be configured by the network, in which a BS may configure UEs with the same SL DRX configuration when the UEs are in the same cell, the same area (which may consists of several cells or several TRPs, transmission and reception points), or the same group for V2X groupcast communication. In this way, a UE and its peer UE may have aligned SL DRX-ON duration due to applying the same SL DRX configuration. The cell/area-specific SL DRX configuration may be delivered via UE-specific dedicated signaling, system information for SL, or pre-configuration for SL.

In one example, the SL DRX configuration may be configured by the network, and the UE may send UE assistance information or Sidelink UE information to the network, reporting current SL traffic pattern or the preferred SL DRX configuration to the network. In addition, the UE may report DRX related statistic (e.g., the percentage of SL DRX active time for a given period of time, and/or the average percentage of the SL DRX active time per SL DRX cycle) or measurement results (e.g., the ratio of time when the UE monitors SCI but there is no SLTx/Rx data sent or received) to the network.

In one example, for a mode-1 and/or mode-2 UE, the SL DRX configuration may be configured by the network, in which a BS may configure UEs participating in the same V2X application/service with the same SL DRX configuration. The V2X application/service specific SL DRX configuration may be delivered via UE-specific dedicated signaling, system information for SL, or pre-configuration.

In one example, for a mode-1 and/or mode-2 UE, the SL DRX configuration may be configured per V2X application/service or per UE ID. In other words, a UE may have separate UE ID for transmission/reception of different V2X applications/services, and thus, the UE may apply different SL DRX configurations for different V2X applications/services.

For groupcast SL communication, all group members (i.e., UEs) in the group may apply the same or aligned SL DRX configuration to enable power saving for group-specific SL communication. The group-specific SL DRX configuration may be configured/assigned/determined by the group leader via groupcast or unicast (e.g. when requested by a group member or when a new group member joins the group), or may be configured by the network.

In one example, when a new group member joins the group, the group leader may provide the group-specific SL DRX configuration for the new group member to align its SL DRX active time with other group members. When the group leader applies a new SL DRX configuration, the group leader may inform its group members of the new SL DRX configuration.

In one example, the network (e.g, a gNB) may configure the same or aligned SL DRX configuration via dedicates signaling to a group member if the group member is in the RRC_CONNECTED state.

In one example, the group leader may provide periodic or on-demand transmission to deliver the group-specific SL DRX configuration.

The group-specific SL DRX configuration may include more parameters, such as an indication of whether this group enables the SL DRX operation, and a timer stamp or a version number for identifying the SL DRX configuration currently applied in this group. If a group member finds that its stored or applied SL DRX configuration is out of date, the group member may send a message (e.g. to the group leader) to request the latest group-specific SL DRX configuration.

SL DRX Configuration Exchange

If the SL DRX configuration is determined by a UE itself, then the UE may need to exchange the SL DRX configuration with its peer UE after it determines its own SL DRX configuration (per MAC entity or per peer UE). In order to exchange the SL DRX configuration with its peer UE, the UE needs to know when its peer UE is awake, so that it may perform SL communication with its peer UE).

In one embodiment, the SL DRX configuration may be exchanged between UEs via the AS-layer information exchange message of the PC5-Radio Resource Control (RRC) connection establishment procedure or the PC5-RRC connection configuration/reconfiguration procedure, e.g., using the RRCRe configuration Sidelink message.

In another embodiment, the SL DRX configuration may be exchanged via a dedicated SL MAC Control Element (CE) or a dedicated PC5-RRC message. For example, a UE may send to its peer UE a PC5-RRC message including one of more SL DRX configurations, and later, the UE may send to its peer UE an SL MAC CE to adjust/select/switch the SL DRX configuration previously sent in the PC5-RRC message.

Ping for Prompt SL Transmission

In contrast to the legacy DRX operation for the Uu interface, where the UE only communicates with the BS, the UE in SL communication may receive packets from multiple peer UEs over the PC5 interface, and the UE needs to stay awake as long as there is ongoing SL communication with at least one peer UE. This means that the UE may not have a complete grasp of the SL DRX active times of all peer UEs. For example, even though UE1 and UE2 may have already exchanged their SL DRX configurations with each other, UE 2 may still be in the SL DRX active time for being engaged in SL communications with other UEs when now is not in UE2's SL DRX-ON duration. Since UE1 does not know if UE2 is engaged in SL communications with other UEs or not, whether UE2 is asleep or awake is unknown to UE1 when UE1 wants to initiate early communication with UE2 during the SL DRX-OFF duration of UE2.

In one embodiment, if now is not in the SL DRX-ON duration of the peer UE, the UE may wait until the start of the next SL DRX-ON duration of the peer UE. Alternatively, the UE may determine whether its peer UE is still in the SL DRX active time when now is not in the SL DRX-ON duration of the peer UE based on the information from received SCI, and initiate early SL communication with the peer UE if the peer UE is still in the SL DRX active time. For example, if the UE has received the SCI from its peer UE recently, which is used for SL communication with other UEs or this UE, then the UE may be able to determine whether the peer UE is still in the SL DRX active time based on the SL DRX inactivity timer of the peer UE. That is, the peer UE may stay in SL DRX active time before its SL DRX inactivity timer (which may be started when the peer UE sends SCI) expires, and the value of the SL DRX inactivity timer of the peer UE may be derived via a previous signaling for SL DRX configuration exchange.

In another embodiment, the UE may send a ping message to its peer UE to check whether the peer UE is still in the SL DRX active time when now is not in the SL DRX-ON duration of the peer UE.

Figure 6:
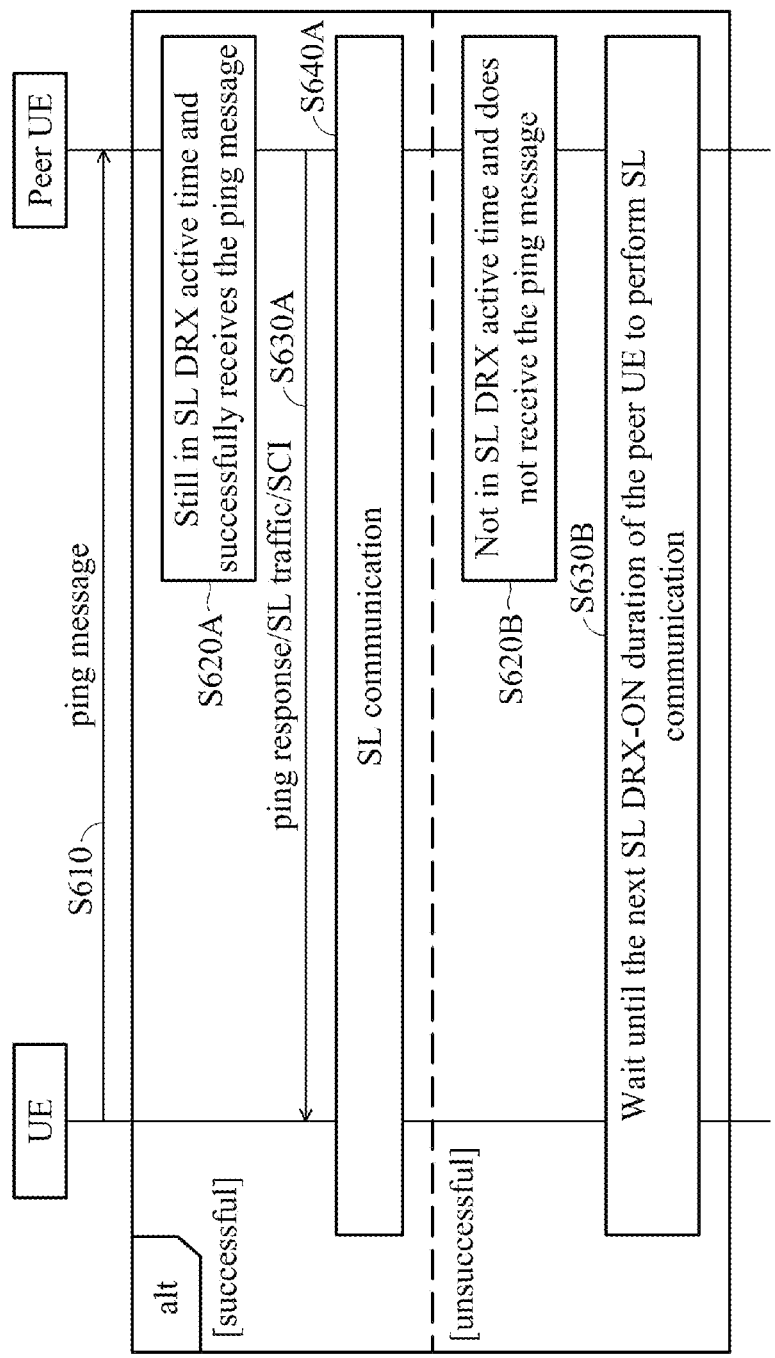
FIG. 6 is a message sequence chart illustrating the use of a ping message for prompt SL communication according to an embodiment of the application.

FIG. 6 is a message sequence chart illustrating the use of a ping message for prompt SL communication according to an embodiment of the application.

In step S610, the UE sends a ping message to the peer UE to check if the peer UE is still in the SL DRX active time.

In one embodiment, the ping message may be sent when the UE wants to communicate with the peer UE when now is not in the SL DRX-ON duration of the peer UE, and the UE has no idea of whether the peer UE is still in the SL DRX active time.

In another embodiment, the ping message may be sent when the UE has high-priority (i.e., priority higher than a threshold) SL traffic to be transmitted. Otherwise, if the SL traffic to be transmitted has a priority below the threshold, the UE is not allowed to send the ping message, and the UE should postpone the SL traffic transmission until the start of the next SL DRX-ON duration of the peer UE, or until an SCI is received from the peer UE.

In yet another embodiment, whether the UE is allowed to send the ping message may be configured or controlled by the network.

Subsequent to step S610, if the ping message is successfully received by the peer UE, steps S620A~S640A are performed as follows.

Specifically, in step S620A, the peer UE successfully receives the ping message due to that the peer UE is still in its SL DRX active time.

In step S630A, the peer UE replies to the UE with a ping response, SL traffic, or an SCI, in response to the ping message.

In step S640A, the UE starts performing SL communication with the peer UE when receiving any response to the ping message from the peer UE.

Subsequent to step S610, if the ping message is not successfully received by the peer UE, steps S620B~S630B are performed as follows.

Specifically, in step S620B, the peer UE does not receive the ping message due to that the peer UE is not in its SL DRX active time.

In step S630B, the UE waits until the next SL DRX-ON duration of the peer UE and then starts performing SL communication with the peer UE.

In one embodiment, the ping message may be carried by a legacy SCI on the PSSCH, and the ping response may be an HARQ ACK. For example, if the peer UE receives an SCI on the PSSCH and finds that the indicated L2 ID matches the ID of the peer UE itself, the peer UE may replies to the UE with an HARQ ACK on the Physical Sidelink Feedback Channel (PSFCH). Alternatively, the ping response may be a separate message, e.g., carried by a separate SCI. For example, as long as the UE receives any message from the peer UE, such as an SCI transmitted by the peer UE regardless of whether the SL traffic from the peer UE is for the UE as well, the UE may consider this as a ping response received.

In another embodiment, an indicator to indicate this message as a ping message may be carried in the SCI field, the MAC header, the MAC sub-header, or a new SL MAC CE may serve as a ping message, or there may be radio resource dedicated for a ping message. For example, a new SL MAC CE dedicated for a ping message may include a new logical channel ID in the MAC sub-header, and optionally, a zero-byte payload. Likewise, if the ping response is not carried on the PSFCH, an indicator to indicate this message as a ping response may be carried in the SCI field, the MAC header, the MAC sub-header, a new SL MAC CE, or the ping response may be transmitted on a radio resource dedicated for a ping response.

Furthermore, if the UE does not receive any ping response in the expected feedback channel or time-frequency radio resource, the UE may retransmit the ping message up to a maximum retransmission limit. When the maximum retransmission limit is reached, the UE may consider that the peer UE is in the SL DRX non-active time, and wait until the next SL DRX-ON duration of the peer UE.

In one embodiment, the UE may wake up and switch to the SL DRX active time at the start of the next SL DRX-ON duration of the peer UE, even if that is not the SL DRX-ON duration of the UE. By doing so, the pending SL traffic may be transmitted as soon as possible. During the period of time in which the UE waits for the next SL DRX-ON duration of the peer UE, the UE may go to sleep for power saving. The period of time may be modelled as a timer associated with the peer UE. For example, a new timer may be introduced to count the length of the period of time, and the UE may enter the SL DRX active time when the UE has SL traffic for the peer UE and the timer associated with the peer UE expires.

Further Power Saving with Wake-Up Signal

According to the SL DRX configuration, a UE needs to wake up periodically to monitor SCI during the SL DRX-ON duration per SL DRX cycle for each peer UE, even if the peer UE may not have any SL traffic for this UE. In order to save the UE's power consumption related to the vain SCI monitoring, the present application proposes the concept of wake-up signals. A wake-up signal may refer to a radio resource dedicated for a UE's peer UEs to wake him up. If the UE detects the presence of the wake-up signal from any peer UE before an upcoming SL DRX-ON duration, then the UE should wake up in the SL DRX-ON duration for SCI monitoring. Otherwise, if the UE does not detect the presence of the wake-up signal from any peer UE before an upcoming SL DRX-ON duration, then the UE may not wake up for one or more upcoming SL DRX-ON durations (i.e., skip one or more SL DRX-ON durations).

Figure 7:
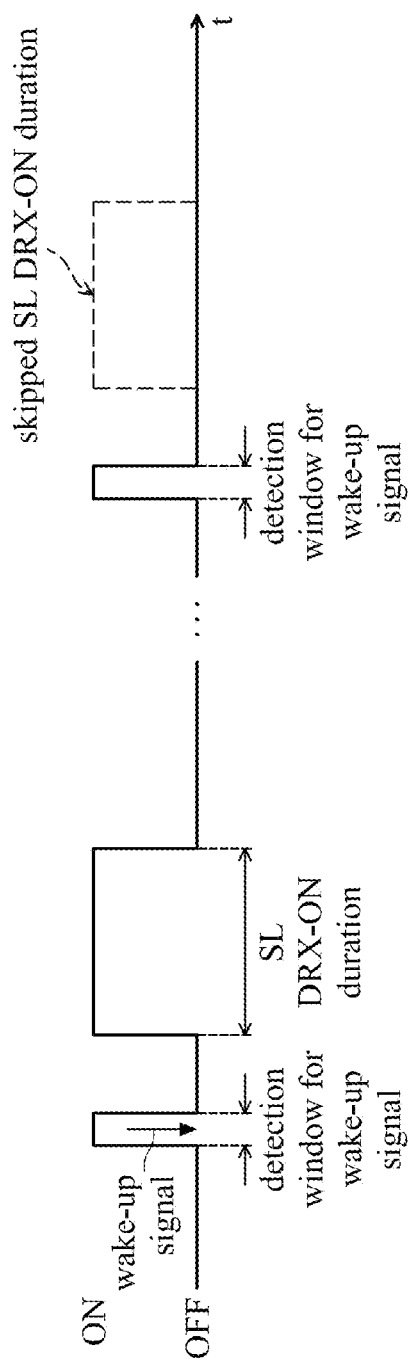
FIG. 7 is a schematic diagram illustrating the improved SL DRX operation using a wake-up signal according to an embodiment of the application.

FIG. 7 is a schematic diagram illustrating the improved SL DRX operation using a wake-up signal according to an embodiment of the application.

As shown in FIG. 7, the UE wakes up for a short period of time (denoted as a detection window for wake-up signal) before each SL DRX-ON duration, to detect if a wake-up signal is received. If the UE detects the presence of a wake-up signal in the detection window, the UE wakes up in the upcoming SL DRX-ON duration to receive SL traffic from the peer UE which sent the wake-up signal. Otherwise, if the UE does not detect the presence of a wake-up signal in the detection window, the UE skips one or more upcoming SL DRX-ON durations. More specifically, if the presence of a wake-up signal from any peer UE is not detected, the UE may be configured to skip the sensing-related behavior such as SCI decoding, e.g., until the coming of the next wake-up signal detection resource.

In one embodiment, the legacy SCI for PSSCH transmission may be used as a wake-up signal. For example, an SCI carrying the destination ID of a UE may be used as a wake-up signal to inform the UE to wake up in the next SL DRX-ON duration.

In one embodiment, a special SCI may be used as a wake-up signal. There may be or may not be a corresponding PSSCH following the SCI/PSCCH.

In one embodiment, a wake-up signal may be carried by an SCI with a wakeup indication in the SCI field.

In one embodiment, the radio resource for a wake-up signal may be separated from the radio resource for SL data transmission (from time/frequency/code domain perspective).

In one embodiment, for a mode-1 UE, the network may configure a periodic radio resource for the UE to receive a wake-up signal.

In one embodiment, if a UE does not monitor its configured time-frequency resource for a wake-up signal due to some reasons (e.g., the configured time-frequency resource is overlapped with a measurement gap), the UE should wake up in the upcoming SL DRX-ON duration for SCI monitoring as if the presence of a wake-up signal is detected before the SL DRX-ON duration.

In one embodiment, the detection window and the periodicity of the wake-up signal may not be related to the SL DRX-ON duration.

In one embodiment, the detection window of the wake-up signal may start from an offset prior to each SL DRX-ON duration, or may start at the first several symbols/slots of each SL DRX-ON duration.

In one embodiment, the detection window may be configured to repeat in each SL DRX cycle or repeat once for several SL DRX cycles.

In one embodiment, a UE may periodically broadcast the information of its UE ID, its SL DRX configuration, and/or the time-frequency resource for wake-up signals. For a new NR-V2X UE who just activates its PC5 interface for SL communication, it may use the SL DRX configuration and the wake-up signal related information broadcasted by the UE to communicate with the UE, without building a PC5-RRC connection with the UE.

In the groupcast scenario, a UE-specific or group-specific wake-up signal configuration may be configured. For example, the UE-specific SL DRX configuration and the UE-specific wake-up signal configuration may be broadcasted/groupcasted by the group leader (periodically or on demand) rather than by each group member itself. In other words, when a group member wants to communicate with another group member, he may determine, based on the broadcast information, when the target group member will monitor the wake-up signal, and therefore, may wake up the target group member for SL communication. For example, a group-specific wake-up resource may be configured, so that when the group leader or a group member has group-specific signaling/data to share, he may send a wake-up signal to wake up one or more group members to monitor the following SL DRX-ON duration for receiving SL traffic. For example, the UE-specific and group-specific wake-up resources may be configured separately, so that a group member may send a wake-up signal on a UE-specific resource when he wants to perform a one-on-one unicast communication with a specific UE, or the group member may send a wake-up signal on the group-specific resource when he wants to perform a groupcast communication.

In the Sidelink relay scenario, UE-specific or group-specific wake-up signal configuration may be broadcasted/groupcasted/delivered by the relay UE (periodically or on demand) rather than by each remote UE itself. When a remote UE wants to communicate with another remote UE or with the relay UE, it may determine, based on the wake-up signal configuration, when the other remote UE or the relay UE will monitor the wake-up signal, and therefore, may wake up the other remote UE or the relay UE for SL communication. Since each remote UE follows the wake-up signal configuration received from the relay UE, the relay UE may wake up any remote UE by the wake-up signal when needed, e.g. when DL data for this remote UE arrives and is waiting for the relay UE to forward via Sidelink. If a group-specific resource for wake-up signals is configured and the relay UE (or a remote UE) has group-specific signaling/data to share, it may send a wake-up signal to wake up one or more group members (e.g. the relay UE or other remote UE associated with this relay UE) to monitor the following SL DRX-ON duration for receiving SL traffic. The UE-specific resource and the group-specific resource for wake-up signals may be configured separately, so that the relay UE may send a wake-up signal on the UE-specific resource when it wants to perform one-on-one unicast communication with a remote UE (e.g., transmitting Sidelink relay data), or the relay UE may send a wake-up signal on the group-specific resource when it wants to perform groupcast communication (e.g., update configuration for Sidelink relay).

To further clarify, the application of wake-up signals is particularly beneficial in the cases where a UE has SL traffic to transmit/receive per tens or hundreds of SL DRX cycles. However, applying the wake-up signal in the following two cases may instead consume more power for SCI monitoring. The first case is that if a UE has frequent SL traffic arrival (regardless of whether Sidelink traffic is from the same or different peer UEs), the UE may have to monitor each SL DRX-ON duration, and unnecessary power may be consume for wake-up signal detection. The second case is that if the SL DRX cycle is relative short (e.g., to support latency-sensitive applications), the resource density for wake-up signal would be high, which means that the UE needs to monitor wake-up signal frequently. Therefore, a UE may activate or deactivate the usage of wake-up signals the traffic arrival rate and the SL DRX cycle length.

In one embodiment, a message may be configured to inform peer UEs whether to apply wake-up signal or not. The message may be delivered via a PC5-RRC message or an SL MAC CE.

In one embodiment, even in the SL DRX non-active time, a UE still monitors some time-frequency resource to discover new peer UE. If a new peer UE is discovered, the UE may exchange the SL DRX configuration, including the configuration of wake-up signal, with the peer UE.

Further Power Saving with DRX Request

In some cases, a UE may want to finish the SL communication with its peer UE even when its SL DRX-ON duration timer or its SL DRX inactivity timer is still running. For example, all SL traffic has been transmitted (i.e., no further data in the SL HARQ buffer for transmission), so the UE would like to go to sleep immediately. For example, a UE may not have sufficient number of HARQ process or HARQ number to deal with simultaneous SL traffic transmission/reception, and thus, the UE may want to postpone some transmission to the next SL DRX cycle. In order to allow the UE to cut short the SL DRX active time, the present application proposes the concept of DRX requests.

Figure 8:
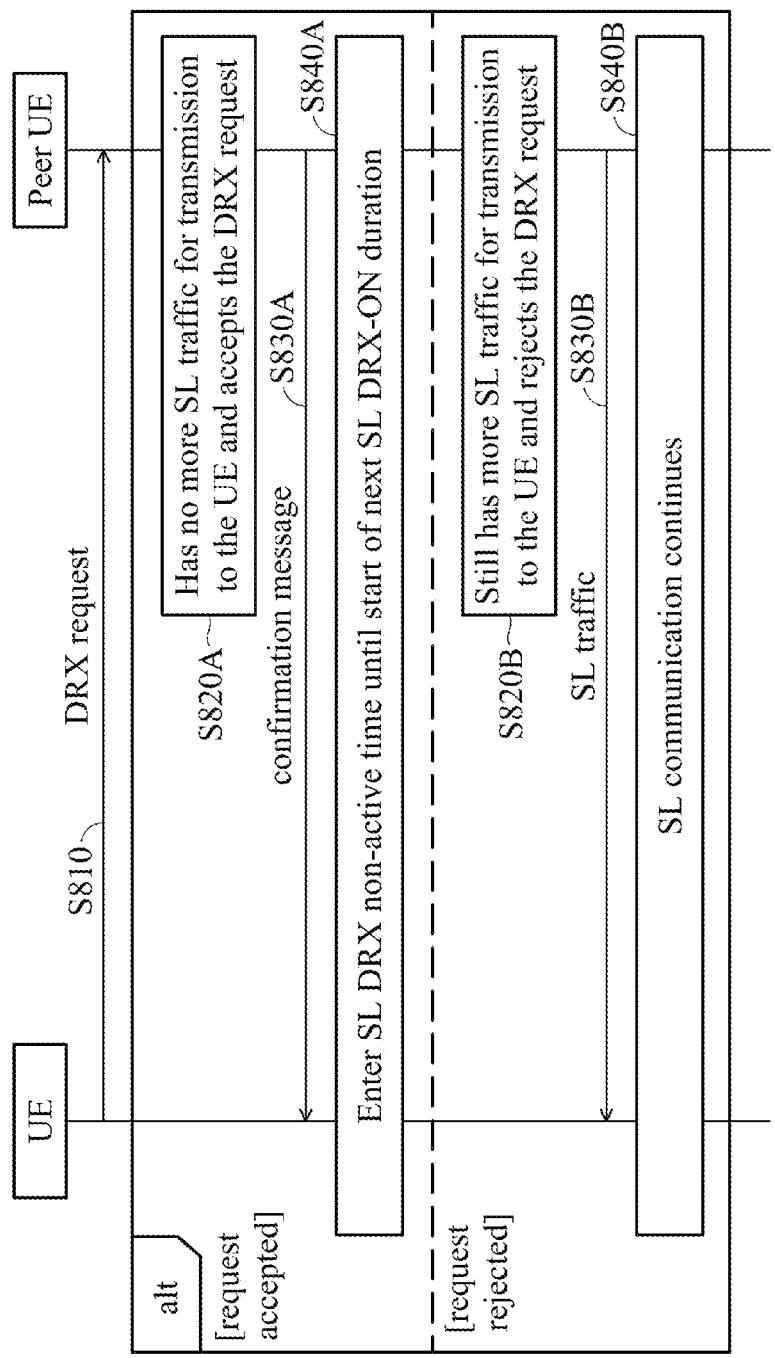
FIG. 8 is a message sequence chart illustrating the improved SL DRX operation using a DRX request according to an embodiment of the application.

FIG. 8 is a message sequence chart illustrating the improved SL DRX operation using a DRX request according to an embodiment of the application.

In step S810, the UE sends a DRX request to the peer UE to request the peer UE to enter the SL DRX non-active time.

In one embodiment, the DRX request may be sent when the UE has no more SL traffic for transmission to the peer UE.

In another embodiment, the DRX request may be sent when the UE has no more high-priority (e.g., above a priority threshold) SL traffic for transmission to the peer UE.

Subsequent to step S810, if the DRX request is accepted by the peer UE, steps S820A~S840A are performed as follows.

Specifically, in step S820A, the peer UE has no more SL traffic (e.g., high-priority SL traffic) as well and accepts the DRX request to enter the SL DRX non-active time.

In step S830A, the peer UE replies to the UE with a message to confirm the acceptance of the DRX request.

In step S840A, both the UE and the peer UE enter the SL DRX non-active time until the start of the next SL DRX-ON duration. That is, the two UEs consider each other in the SL DRX non-active time, and will perform SL communication, if required, in later transmission opportunity in which both UEs are in the SL DRX active time (e.g., in the next SL DRX-ON duration).

Subsequent to step S810, if the DRX request is rejected by the peer UE, steps S820B~S840B are performed as follows.

Specifically, in step S820B, the peer UE still has SL traffic (e.g., high-priority SL traffic) for transmission to the UE and rejects the DRX request to enter the SL DRX non-active time.

In step S830B, the peer UE continues to transmit the remaining SL traffic to the UE.

In step S840B, the SL communication between the UE and the peer UE continues.

In one embodiment, if the peer UE still has SL traffic for transmission to the UE, the peer UE may continue to transmit the SL traffic and ignore the DRX request or send the confirmation message upon completing the transmission of remaining SL traffic.

Figure 9:
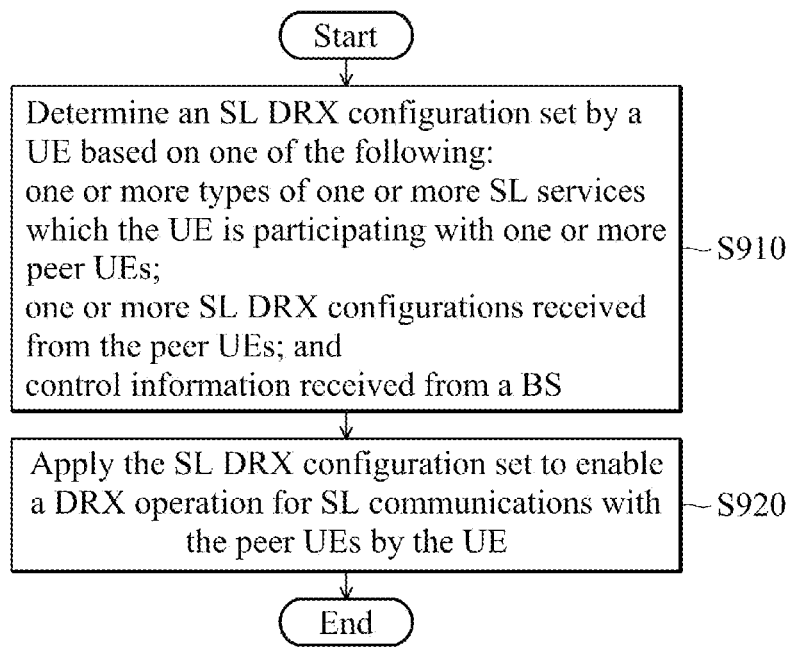
FIG. 9 is a flow chart illustrating the method for DRX support in SL communication according to an embodiment of the application.

FIG. 9 is a flow chart illustrating the method for DRX support in SL communication according to an embodiment of the application.

In this embodiment, the method for DRX support in SL communication is applied to and executed by a UE.

To begin with, the UE determines an SL DRX configuration set based on one of the following: one or more types of one or more SL services which the UE is participating with one or more peer UEs, one or more SL DRX configurations received from the peer UEs, and control information received from a BS (step S910).

Next, the UE applies the SL DRX configuration set to enable a DRX operation for SL communications with the peer UEs (step S920).

Specifically, the SL DRX configuration set may include the one or more SL DRX configurations, each corresponding to the DRX operation for SL communication with a respective one of the peer UEs, and each of the SL DRX configurations may include information of an SL DRX offset, an SL DRX cycle, an SL DRX-ON duration, and an SL DRX inactivity timer.

In one embodiment, the SL DRX configurations from the peer UEs may be received via at least one of a PC5-RRC message, and an SL MAC CE.

In one embodiment, the control information received from the BS may include a DRX configuration applied to enable another DRX operation for communication with the BS.

In view of the forgoing embodiments, it will be appreciated that the present application realizes robust and efficient power saving for NR-based V2X, by providing an SL DRX operation for the PC5 interface. In particular, the parameters (e.g., SL DRX offset, SL DRX cycle, and SL DRX active time) and counters (e.g., SL DRX-ON duration timer, SL DRX inactivity timer, DRX retransmission timer for SL Rx/Tx, and HARQ RTT timer for SL Rx/Tx) used in the SL DRX operation adapt to the evolution of NR-based V2X.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The invention claimed is:

1. A User Equipment (UE), comprising:
   a wireless transceiver, configured to perform wireless transmission and reception to and from one or more peer UEs; and
   a controller, configured to determine one or more Sidelink (SL) Discontinuous Reception (DRX) configurations, and apply the one or more SL DRX configurations to enable an SL DRX operation for SL communications with the peer UEs via the wireless transceiver, each SL DRX configuration including at least one of an SL DRX cycle, an SL DRX-ON duration, an SL DRX start offset, and an SL DRX inactivity timer;
   wherein the UE is configured to perform the SL DRX operation to monitor a Sidelink Control Information (SCI) during an SL active time, and the SL active time is determined according to the corresponding one or more SL DRX configurations,
   the UE maintains separate SL active times for different SL DRX configurations when multiple SL DRX configurations corresponding to the multiple peer UEs for unicast, groupcast, or broadcast communication are applied.

2. The UE as claimed in claim 1, wherein the controller further turns on the wireless transceiver when the UE is in the SL DRX-ON duration, turns off the wireless transceiver when the UE is not in the SL DRX-ON duration, except when the inactivity timer is running, and starts the inactivity timer in response to one of the following conditions:
the UE receives SL-related Radio Network Temporary Identifier (RNTI) from the BS for configuring SL resources or for SL configured grant activation or deactivation;
the UE receives Sidelink Control Information (SCI) associated with one of the SL services from one of the peer UEs;
the UE selects from the SL resources for data transmission to one of the peer UEs when SL mode-2 resource scheduling is configured for the UE.

3. The UE as claimed in claim 1, wherein a first active time of the DRX operation for SL communications with the peer UEs is related to a second active time of another DRX operation for communication with a BS; and the second active time is extended or the first active time is stopped, when the second active time has elapsed and the first active time has not elapsed.

4. The UE as claimed in claim 1, wherein the SCI is received from a BS comprises a DRX configuration applied to enable another DRX operation for communication with the BS.

5. The UE as claimed in claim 1, wherein the SL DRX configurations for unicast are derived from the peer UEs via a PC5-Radio Resource Control (RRC) message.

6. The UE as claimed in claim 1, wherein the controller further sends a message to one of the peer UEs via the wireless transceiver in response to the peer UE not being in the SL DRX-ON duration of the one or more SL DRX configurations associated with the peer UE, and perform SL communication with the peer UE in response to receiving a response to the message from the peer UE.

7. The UE as claimed in claim 1, wherein the controller further turns on the wireless transceiver for a period of time prior to the SL DRX-ON duration corresponding to the DRX operation for SL communication with one of the peer UEs, to determine whether a signal is received from the peer UE, and turns off the wireless transceiver for a next SL DRX-ON duration corresponding to the DRX operation for SL communication with the peer UE in response to not receiving a signal from the peer UE in the period of time.

8. The UE as claimed in claim 1, wherein the controller further sends a request to one of the peer UEs via the wireless transceiver in the SL DRX-ON duration corresponding to the DRX operation for SL communication with the peer UE, to enable the peer UE to turn off its wireless transceiver until the start of a next SL DRX-ON duration.

9. The UE as claimed in claim 1, wherein the UE determines the SL DRX being in the SL active time is based on at least one of the following conditions:
an onDurationTimer of the SL DRX is running;
an inactivity timer of the SL DRX is running;
a retransmission timer of transmission or reception HARQ process applying the corresponding SL DRX configuration is running; and
the UE has a pending CSI report to transmit or receive.

10. The UE as claimed in claim 1, wherein at least one of SL DRX configurations for unicast is configured per source UE ID and destination UE ID.

11. The UE as claimed in claim 1, wherein at least one of SL DRX configurations for broadcast and groupcast is configured per destination ID.

12. The method of claim 1, wherein the UE is configured to monitor SCI corresponding to multiple SL DRX configurations when any one of SL DRX corresponding to the multiple SL DRX configurations being in an active time.

13. A method performed by a UE, comprising:
determining one or more SL DRX configurations-, each SL DRX configuration includes at least one of an SL DRX cycle, an SL DRX-ON duration, an SL DRX start offset, and an SL DRX inactivity timer;
applying the SL DRX configuration to enable a DRX operation for SL communications with one or more peer UEs;
performing the SL DRX operation to monitor a Sidelink Control Information (SCI) during an SL active time, and the SL active time is determined according to the corresponding one or more SL DRX configurations; and
maintaining separate SL active times for different SL DRX configurations when multiple SL DRX configurations corresponding to the multiple peer UEs for unicast, groupcast, or broadcast communication are applied.

14. The method as claimed in claim 13, further comprising:
turning on a wireless transceiver of the UE when the UE is in the SL DRX-ON duration;
turning off the wireless transceiver when the UE is not in the SL DRX-ON duration, except when the inactivity timer is running; and
starting the inactivity timer in response to one of the following conditions:
the UE receives SL-related RNTI from the BS for configuring SL resources or for SL configured grant activation or deactivation;
the UE receives SCI associated with one of the SL services from one of the peer UEs;
the UE selects from the SL resources for data transmission to one of the peer UEs when SL mode-2 resource scheduling is configured for the UE.

15. The method as claimed in claim 13, wherein a first active time of the DRX operation for SL communications with the peer UEs is related to a second active time of another DRX operation for communication with a BS; and the second active time is extended or the first active time is stopped, when the second active time has elapsed and the first active time has not elapsed.

16. The method as claimed in claim 13, wherein the SCI is received from a BS comprises a DRX configuration applied to enable another DRX operation for communication with the BS.

17. The method as claimed in claim 13, wherein the SL DRX configurations from the peer UEs are received via at least one of a PC5-RRC message, and an SL MAC CE.

18. The method as claimed in claim 13, further comprising:
sending a message to one of the peer UEs in response to the peer UE not being in the SL DRX-ON duration of the SL DRX configuration associated with the peer UE; and
performing SL communication with the peer UE in response to receiving a response to the message from the peer UE.

19. The method as claimed in claim 13, further comprising:
turning on a wireless transceiver of the UE for a period of time prior to the SL DRX-ON duration corresponding to the DRX operation for SL communication with one of the peer UEs, to determine whether a signal is received from the peer UE; and turning off the wireless transceiver for a next SL DRX-ON duration corresponding to the DRX operation for SL communication with the peer UE in response to not receiving a signal from the peer UE in the period of time.

20. The method as claimed in claim 13, further comprising:

sending a request to one of the peer UEs in the SL DRX-ON duration corresponding to the DRX operation for SL communication with the peer UE, to enable the peer UE to turn off its wireless transceiver until the start of a next SL DRX-ON duration.

21. The method of claim 13, wherein the UE determines the SL DRX being in the SL active time is based on at least one of the following conditions:

an onDurationTimer of the SL DRX is running;
an inactivity timer of the SL DRX is running;
a retransmission timer of transmission or reception HARQ process applying the corresponding SL DRX configuration is running; and
the UE has a pending CSI report to transmit or receive.

* * * * *